US000002036H

(19) United States

(12) Statutory Invention Registration

Bush

(10) Reg. No.: US H2036 H

(43) Published: Jul. 2, 2002

(54) HIGH CIS-1,4-POLYBUTADIENE RUBBER COMPOUNDS

(75) Inventor: Jerry Levi Bush, Kent, OH (US)

(73) Assignee: The Goodyear Tire & Rubber Company, Akron, OH (US)

(21) Appl. No.: 09/324,371

(22) Filed: Jun. 2, 1999

(51) Int. Cl.[7] ..... C08L 9/00; C08L 47/00; A63B 37/04

(52) U.S. Cl. ..... 525/236; 525/237; 525/269; 525/274; 473/372

(58) Field of Search ..... 525/236, 237, 525/269, 274; 473/371, 372

(56) References Cited

U.S. PATENT DOCUMENTS

| | | | | |
|---|---|---|---|---|
| 3,638,702 A | * | 2/1972 | Endter | |
| 3,781,067 A | * | 12/1973 | Dodson | |
| 3,856,764 A | | 12/1974 | Throckmorton et al. | 260/82.1 |
| 3,910,869 A | | 10/1975 | Throckmorton | 260/94.3 |
| 3,962,375 A | | 6/1976 | Throckmorton et al. | 526/335 |
| 4,383,097 A | | 5/1983 | Castner et al. | 526/133 |
| 4,683,257 A | * | 7/1987 | Kakiuchi | |
| 4,929,678 A | | 5/1990 | Hamada et al. | 525/193 |
| 4,955,613 A | * | 9/1990 | Gendreau | |
| 5,100,982 A | | 3/1992 | Castner | 526/143 |
| 5,451,646 A | | 9/1995 | Castner | 526/137 |
| 5,585,440 A | * | 12/1996 | Yamada | |
| 5,698,643 A | | 12/1997 | Donbar et al. | 526/142 |
| 6,139,447 A | | 10/2000 | Ohama | |

* cited by examiner

*Primary Examiner*—Michael J. Carone
*Assistant Examiner*—Aileen J. Baker
(74) *Attorney, Agent, or Firm*—Alvin T Rockhill

(57) ABSTRACT

This invention relates to blends of a specific type of cis-1,4-polybutadiene rubber with other rubbery polymers, such as natural rubber, synthetic polyisoprene rubber, styrene-butadiene rubber, isoprene-butadiene rubber and/or styrene-isoprene- butadiene rubber. The cis-1,4-polybutadiene rubber utilized in the blends of this invention is synthesized by polymerizing 1,3-butadiene in the presence of (a) an organonickel compound, (b) an organoaluminum compound, (c) a fluorine containing compound and (d) para-styrenated diphenylamine; wherein the organoaluminum compound and the fluorine containing compound are brought together in the presence of the para-styrenated diphenylamine. The cis-1,4-polybutadiene rubber blends of this invention offer improved processability and enhanced physical properties. For instance, improved mixing which results in better incorporation of pigments and fillers, such as carbon black and silica, at lower levels of power consumption is realized. Additionally, improvements in extrusion characteristics and in tear resistance with little sacrifice in hysteretic properties, abrasion resistance and modulus are also attained with the rubber blends of this invention. The rubber blends of this invention can be used in manufacturing a wide variety of rubber products, such as tires, hoses, belts, golf balls, tennis balls, racquet balls, golf club grips, stoppers, plungers, tubing, straps, diaphragms, motor mounts, bushings, weather stripping, windshield wiper blades, shoe soles, other molded rubber products and adhesives.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH CIS-1,4-POLYBUTADIENE RUBBER COMPOUNDS

BACKGROUND OF THE INVENTION

Nickel-based catalyst systems are commonly used in the polymerization of 1,3-butadiene monomer into cis-1,4-polybutadiene rubber. Such nickel-based catalyst systems contain (a) an organonickel compound, (b) an organoaluminum compound and (c) a fluorine containing compound. Such nickel-based catalyst systems and their use in the synthesis of cis-1,4-polybutadiene is described in detail in U.S. Pat. No. 3,856,764, U.S. Pat. No. 3,910,869 and U.S. Pat. No. 3,962,375.

The cis-1,4-polybutadiene prepared utilizing such nickel-based catalyst systems typically has a high molecular weight. Due to this high molecular weight, the cis-1,4-polybutadiene is generally oil-extended. However, this precludes the cis-1,4-polybutadiene from being utilized in many applications. For instance, such oil-extended rubbers cannot be utilized in tire sidewalls which contain white sidewall compounds. In any case, there is a large demand for cis-1,4-polybutadiene having a reduced molecular weight which can be processed without being oil-extended.

Various compounds have been found to act as molecular weight-reducing agents when used in conjunction with the nickel-based catalyst system. For instance, U.S. Pat. No. 4,383,097 discloses that alpha-olefins, such as ethylene and propylene, act as molecular weight-reducing agents when utilized in conjunction with such three-component nickel catalyst systems. U.S. Pat. No. 5,698,643 indicates that 1-butene, isobutylene, cis-2-butene, trans-2-butene and allene act as molecular weight regulators when used in conjunction with such nickel-based catalyst systems. U.S. Pat. No. 4,383,097 reveals that certain nonconjugated diolefins, such as 1,4-pentadiene, 1,6-heptadiene and 1,5-hexadiene, act as molecular weight-reducing agents when utilized in conjunction with such catalyst systems. U.S. Pat. No. 5,100,982 indicates that cis-1,4-polybutadiene having reduced molecular weight and a broad molecular weight distribution can be synthesized with certain nickel-based catalyst systems in the presence of halogenated phenols, such as para-chlorophenol.

The processability of cis-1,4-polybutadiene rubbers can be improved by simply lowering their molecular weight. However, this approach also typically leads to increased cold flow. Accordingly, the use of conventional molecular weight-reducing agents, such as α-olefins, to improve rubber processability leads to compromised cold flow characteristics.

U.S. Pat. No. 5,451,646 discloses that para-styrenated diphenylamine acts as a molecular weight-reducing agent when employed in conjunction with nickel-based catalyst systems which contain (a) an organonickel compound, (b) an organoaluminum compound and (c) a fluorine containing compound. The teachings of U.S. Pat. No. 5,451,646 also indicate that para-styrenated diphenylamine acts to improve the processability of cis-1,4-polybutadiene rubbers prepared in their presence utilizing such nickel-based catalyst systems. Para-styrenated diphenylamine can be employed in conjunction with such nickel-based catalyst systems to reduce the molecular weight of the rubber without sacrificing cold flow characteristics. The para-styrenated diphenylamine which remains in the rubber produced also acts in a manner which provides it with antioxidant protection. In other words, the para-styrenated diphenylamine accomplishes two major objectives. It acts as a molecular weight regulator and acts as an antidegradant.

U.S. Pat. No. 5,451,646 specifically discloses a process for producing cis-1,4-polybutadiene having a reduced molecular weight and improved processability which comprises polymerizing 1,3-butadiene in the presence of (a) an organonickel compound, (b) an organoaluminum compound, (c) a fluorine containing compound and (d) para-styrenated diphenylamine; wherein the organoaluminum compound and the fluorine containing compound are brought together in the presence of the para-styrenated diphenylamine.

U.S. Pat. No. 4,929,678 discloses a rubber composition for a solid golf ball having excellent durability and rebound properties comprising: (a) a rubber component comprising at least 40 percent by weight of a polybutadiene rubber which has a Mooney ML 1+4 viscosity of 50 to 70 and a cis-1,4 bond content of at least 80 percent, (b) a co-crosslinking agent and (c) a peroxide.

SUMMARY OF THE INVENTION

It has been found that blends of cis-1,4-polybutadiene rubber with other rubbery polymers offer improved processability and improved physical characteristics in cases where the cis-1,4- polybutadiene rubber is synthesized by polymerizing 1,3-butadiene in the presence of (a) an organonickel compound, (b) an organoaluminum compound, (c) a fluorine containing compound and (d) para-styrenated diphenylamine. Such cis-1,4-polybutadiene rubber blends offer improved processability and enhanced physical properties. For instance, improved mixing which results in better incorporation of pigments and fillers, such as carbon black and silica, at lower levels of power consumption is realized. Additionally, improvements in tear resistance with little sacrifice in hysteretic properties, abrasion resistance and modulus are also attained with the rubber blends of this invention. The rubber blends of this invention can be used in manufacturing a wide variety of rubber products, such as tires, hoses, belts, golf balls, tennis balls, racquet balls, golf club grips, stoppers, plungers, tubing, straps, diaphragms, motor mounts, bushings, weather stripping, windshield wiper blades, shoe soles, other molded rubber products and adhesives.

The present invention more specifically discloses a golf ball which is comprised of a solid core and a resin cover, wherein the solid core is comprised of cis-1,4-polybutadiene rubber which is made by polymerizing 1,3-butadiene in the presence of (a) an organonickel compound, (b) an organoaluminum compound, (c) a fluorine containing compound and (d) para-styrenated diphenylamine; wherein the organoaluminum compound and the fluorine containing compound are brought together in the presence of the para-styrenated diphenylamine.

The present invention further reveals a rubber composition for a solid golf ball having excellent durability and rebound properties comprising: (a) cis-1,4-polybutadiene rubber, wherein said cis-1,4-polybutadiene rubber has a Mooney ML 1+4 viscosity of 35 to 70, wherein said cis-1,4-polybutadiene rubber has a cis-1,4 bond content of at least 95 percent, wherein cis-1,4-polybutadiene rubber is made by polymerizing 1,3-butadiene in the presence of (a) an organonickel compound, (b) an organoaluminum compound, (c) a fluorine containing compound and (d) para-styrenated diphenylamine, and wherein the organoaluminum compound and the fluorine containing compound are brought together in the presence of the para-styrenated diphenylamine; (b) a co-crosslinking agent and (c) a peroxide.

The present invention also discloses a tire tread compound which is comprised of (1) about 40 phr to about 60 phr of cis-1,4-polybutadiene, wherein cis-1,4-polybutadiene rubber is made by polymerizing 1,3-butadiene in the presence of (a) an organonickel compound, (b) an organoaluminum compound, (c) a fluorine containing compound and (d) para-styrenated diphenylamine, wherein the organoaluminum compound and the fluorine containing compound are brought together in the presence of the para-styrenated diphenylamine; and (2) about 40 phr to about 60 phr of at least one rubbery polymer selected from the group consisting of natural rubber, solution styrene-butadiene rubber and emulsion styrene-butadiene rubber.

DETAILED DESCRIPTION OF THE INVENTION

The cis-1,4-polybutadiene rubber used in the blends of this invention are synthesized utilizing the procedure described in U.S. Pat. No. 5,451,646. The teachings of U.S. Pat. No. 5,451,646 are incorporated herein by reference in their entirety. Such cis-1,4-polybutadiene rubber is also sold by The Goodyear Tire & Rubber Company as Budene® 1280 cis- 1,4-polybutadiene rubber.

The cis-1,4-polybutadiene rubber will typically be synthesized by solution polymerization in a hydrocarbon solvent which can be one or more aromatic, paraffinic or cycloparaffinic compounds. These solvents will normally contain from 4 to about 10 carbon atoms per molecule and will be liquids under the conditions of the polymerization. Some representative examples of suitable organic solvents include isooctane, cyclohexane, normal hexane, benzene, toluene, xylene, ethylbenzene, and the like, alone or in admixture.

Para-styrenated diphenylamine will also act as molecular weight-reducing agent in bulk polymerizations which are carried out with nickel-based catalyst systems containing (a) an organonickel compound, (b) an organoaluminum compound and (c) a fluorine containing compound. Such bulk polymerizations are described in detail in U.S. Pat. No. 5,652,304 and U.S. Pat. No. 5,859,156. The teachings of U.S. Pat. No. 5,652,304 and U.S. Pat. No. 5,859,156 are incorporated herein by reference in their entirety.

In the solution polymerizations employed in the synthesis of the cis-1,4-polybutadiene, there will normally be from about 5 to about 35 weight percent monomers in the polymerization medium. Such polymerization media are, of course, comprised of the organic solvent and the 1,3-butadiene monomer. As the polymerization proceeds, monomer is converted to polymer and accordingly the polymerization medium will contain from about 5 to about 35 weight percent unreacted monomers and polymer. In most cases, it will be preferred for the polymerization medium to contain from about 10 to about 30 weight percent monomers and polymers. It is generally more preferred for the polymerization medium to contain from 20 to 25 weight percent monomers and polymers.

Polymerization is typically started by adding the nickel-based catalyst system and the para-styrenated diphenylamine to the polymerization medium. However, it is critical for the organoaluminum compound and the fluorine containing compound to be brought together in the presence of the para-styrenated diphenylamine. The organonickel compound can be brought into contact with the para-styrenated diphenylamine either before or after it is brought into contact with the fluorine containing compound.

In batch techniques, it is normally convenient to add the catalyst components and the para-styrenated diphenylamine to a polymerization medium which already contains 1,3-butadiene monomer in an organic solvent. This is preferably done by sequentially adding (1) the organoaluminum compound, (2) the para-styrenated diphenylamine, (3) the organonickel compound and (4) the fluorine containing compound to the polymerization medium. Another preferred batch technique involves the sequential addition of (1) the organoaluminum compound, (2) the organonickel compound, (3) the para-styrenated diphenylamine and (4) the fluorine containing compound to the polymerization medium. Also, the p-styrenated diphenylamine can be pre-reacted with the fluorine containing compound with the resultant product being added to the polymerization medium.

The organoaluminum compound that can be utilized in the catalyst system has the structural formula:

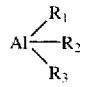

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups and arylalkyl groups. It is preferred for $R_1$, $R_2$ and $R_3$ to represent alkyl groups which contain from 1 to about 10 carbon atoms. It is more preferred for $R_1$, $R_2$ and $R_3$ to represent alkyl groups which contain from two to five carbon atoms.

Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H) and diethyl aluminum fluoride.

The component of the catalyst which contains nickel can be any soluble organonickel compound. These soluble nickel compounds are normally compounds of nickel with a mono-dentate or bi-dentate organic ligands containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis (cyclopentadiene) nickel, bis(salicylaldehyde) ethylene diimine nickel, cyclopentadienyl-nickel nitrosyl, bis(π-allyl nickel), bis(π cycloocta-1,5-diene), bis(π-allyl nickel trifluoroacetate) and nickel tetracarbonyl. The preferred component containing nickel is a nickel salt of a carboxylic acid or an organic complex compound of nickel. Nickel naphthenate, nickel octanoate and nickel neodecanoate are highly preferred soluble nickel containing compounds. Nickel 2-ethylhexanoate, which is commonly referred to as nickel octanoate (NiOct), is the soluble nickel containing compound which is most commonly used due to economic factors.

The fluorine containing compound utilized in the catalyst system is generally hydrogen fluoride or boron trifluoride. If hydrogen fluoride is utilized, it can be in the gaseous or liquid state. In cases where hydrogen fluoride is employed, it should, of course, be anhydrous and as pure as possible. The hydrogen fluoride can be dissolved in an inert solvent and, thus, can be handled and charged into the reaction zone as a liquid solution. Optionally, butadiene monomer can be utilized as the solvent. Inert solvents include alkyl-, alkaryl-, arylalkyl- and aryl-hydrocarbons. For example, benzene and toluene are convenient solvents.

In cases where boron trifluoride is used as a component of the catalyst, it can be the gaseous state. It should also be anhydrous and as pure as possible. The hydrogen fluoride complexes and/or boron trifluoride complexes can also be utilized in the catalyst system as the fluorine containing compound. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitrites, amines and water.

The ketone subclass can be defined by the formula

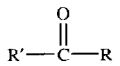

wherein R' and R are selected from the group consisting of alkyl radicals, cycloalkyl radicals, aryl radicals, alkaryl radicals and arylalkyl radicals containing from 1 to about 30 carbon atoms; and wherein R' and R can be the same or different. These ketones represent a class of compounds which have a carbon atom attached by a double bond to oxygen. Some representative examples of ketones that are useful in the preparation of the ketone-hydrogen fluoride complexes or boron trifluoride complexes of this invention include dimethyl ketone, methylethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone, and the like. The preferred ketones that can be used to form the ketone-hydrogen fluoride compounds and the ketone-boron trifluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex or boron trifluoride nitrile complex is the hydrogen fluoride benzonitrile complex or the boron trifluoride benzonitrile complex.

The alcohol subclass can be defined by the formula ROH where R represents alkyl radicals, cycloalkyl radicals, aryl radicals, alkaryl radicals or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes and boron trifluoride complexes are methanol, ethanol, n-propanol, isopropanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl radicals, cycloalkyl radicals, aryl radicals, alkaryl radicals and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether, and the like. The preferred hydrogen fluoride-ether complexes or boron trifluoride-ether complexes are hydrogen fluoride diethyl etherate, hydrogen fluoride dibutyl etherate, boron trifluoride diethyl etherate and/or boron trifluoride dibutyl etherate complexes.

The ester subclass can be defined by the formula

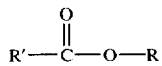

wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

The hydrogen fluoride can also be utilized as a complex with the p-styrenated diphenylamine. In this case, the para-styrenated diphenylamine and hydrogen fluoride form a salt which is soluble in aromatic solvents, such as toluene. When added to the polymerization system, the salt reacts with the organoaluminum compound to form alkylaluminum fluorides and free p-styrenated diphenylamine.

Such complexes are usually prepared by simply bubbling gaseous boron trifluoride or hydrogen fluoride into appropriate amounts of the complexing agent, for instance, a ketone, an ether, an ester, an alcohol or a nitrile. This should be done in the absence of moisture, and measures should be taken to keep the temperature from rising above about 100° F. (37.7° C.). In most cases, boron trifluoride and hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations can be determined by weight gain or chemical titration.

The three component catalyst system utilized can be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, acetylenic hydrocarbons, triolefins, vinyl ethers and aromatic nitriles.

Some representative examples of olefins that can be used as the preforming agent in the preparation of stabilized catalysts are trans-2-butene, mixed cis and trans-2-pentene, and cis-2-pentene. Some nonconjugated diolefins that can be used as preforming agents are cis-1,4-hexadiene, 1,5-heptadiene, 1,7-octadiene, and the like. Representative examples of cyclic nonconjugated multiolefins that can be used include 1,5-cyclooctadiene, 1,5,9-cyclododecatriene and 4-vinyl cyclohexene-1. Some representative examples of acetylenic hydrocarbons which can be used as the preforming agent are methyl acetylene, ethyl acetylene, 2-butyne, 1-pentyne, 2-pentyne, 1-octyne and phenyl acetylene. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6-octadiene), and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound and the para-styrenated diphenylamine. The nickel compound and the para-styrenated diphenylamine are then added to the solution with the fluoride compound being added to the solution subsequently. As an alternative, the preforming agent and the nickel compound may be mixed, followed by the addition of the organoaluminum compound, the para-styrenated diphenylamine and then the fluoride compound or the hydrogen fluoride/p-styrenated diphenylamine complex. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period, for example 15 to 30 minutes, at a moderate temperature, for example 50° C., increases the activity of the preformed catalyst greatly.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The three component nickel catalyst system can also be premixed. Such premixed catalyst systems are prepared in the presence of one or more polymeric catalyst stabilizers. The polymeric catalyst stabilizer can be in the form of a liquid polymer, a polymer cement or a polymer solution. Polymeric catalyst stabilizers are generally homopolymers of conjugated dienes or copolymers of conjugated dienes with styrenes and methyl substituted styrenes. The diene monomers used in the preparation of polymeric catalyst stabilizers normally contain from 4 to about 12 carbon atoms. Some representative examples of conjugated diene monomers that can be utilized in making such polymeric catalyst stabilizers include isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

Some representative examples of polymeric catalyst stabilizers include polyisoprene, polybutadiene, polypiperylene, copolymers of butadiene and styrene, copolymers of butadiene and α-methylstyrene, copolymers of isoprene and styrene, copolymers of isoprene and α-methylstyrene, copolymers of piperylene and styrene, copolymers of piperylene and α-methylstyrene, copolymers of 2,3-dimethyl-1,3-butadiene and styrene, copolymers of 2,3-dimethyl butadiene and α-methylstyrene, copolymers of butadiene and vinyltoluene, copolymers of 2,3-dimethyl-1,3-butadiene and vinyltoluene, copolymers of butadiene and β-methylstyrene, and copolymers of piperylene and β-methylstyrene.

In order to properly stabilize the catalyst system by this premixing technique, the polymeric catalyst stabilizer must be present before the organoaluminum compound has an opportunity to react with either the nickel compound or the fluorine containing compound. The para-styrenated diphenylamine will, of course, be present when the organoaluminum compound is brought into contact with the fluorine containing compound. If the catalyst system is premixed without the presence of at least a small amount of polymeric catalyst stabilizer, the chemical effect of the organoaluminum compound upon the nickel compound or the fluoride compound is such that the catalytic activity of the catalyst system is greatly lessened and shortly thereafter rendered inactive. In the presence of at least a small amount of polymeric catalyst stabilizer, the catalytic or shelf life of the catalyst system is greatly improved over the same system without any polymeric catalyst stabilizer present.

One method of preparing this premixed catalyst system so that it will be highly active and relatively chemically stable is to add the organoaluminum compound to the polymer cement solution and mix thoroughly before the organoaluminum compound comes into contact with the nickel containing compound. The nickel compound is then added to the polymer cement solution. Alternatively, the nickel compound can be mixed with the polymer cement first, followed by the addition of the organoaluminum compound and the para-styrenated diphenylamine. Then, the fluorine containing compound is added to the polymer cement solution. This is not intended to preclude other orders or methods of catalyst addition, but it is emphasized that the polymer stabilizer must be present before the organoaluminum compound has a chance to react with either the nickel containing compound or the fluorine containing compound.

The amount of polymeric catalyst stabilizer used to premix the catalyst system can be within the range of about 0.01 to 3 weight percent of the total amount monomer to be polymerized. Expressed as a weight ratio of polymeric catalyst stabilizer to nickel, the amount of polymeric catalyst stabilizer present during the premixing step can be within the range of about 2 to 2000 times the concentration of nickel. The preferred weight ratio of polymeric catalyst stabilizer to nickel is from about 4:1 to about 300:1. Even though such premixed catalyst systems show catalytic activity immediately after being prepared, it has been observed that a short aging period, for example 15 to 30 minutes, at moderate temperatures, for example 50° C., increases the activity of the preformed catalyst system.

A "modified in situ" technique can also be used in making the three component nickel catalyst system. In fact, the utilization of catalysts made by such "modified in situ" techniques results in more uniform control of the polymerization and the polymeric product. In such a "modified in situ" technique, the organoaluminum compound is added to neat 1,3-butadiene monomer with the nickel containing compound and the para-styrenated diphenylamine being added later. The butadiene monomer containing the organoaluminum compound, the para-styrenated diphenylamine and the nickel containing compound is then charged into the reaction zone being used for the polymerization with the fluorine containing compound being charged into the reaction zone separately. Normally, the organoaluminum compound, the para-styrenated diphenylamine and the nickel containing compound are charged into the reaction zone soon after being mixed into the butadiene monomer. In most cases, the organoaluminum compound, the para-styrenated diphenylamine and the nickel containing compound are charged into the reaction zone within 60 seconds after being mixed in the butadiene monomer. It will generally be desirable to utilize organoaluminum compounds and nickel containing compounds which have been dissolved in a suitable solvent.

The three-component nickel catalyst systems have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range. Polymerizations can be carried out utilizing a mole ratio of the organoaluminum compound to the nickel containing compound within the range of from about 0.3:1 to about 300:1; with the mole ratio of the fluorine containing compound to the organonickel containing compound ranging from about 0.5:1 to about 200:1 and with the mole ratio of the fluorine containing compound to the organoaluminum compound ranges from about 0.4:1 to about 10:1. The preferred mole ratios of the organoaluminum compound to the nickel containing compound ranges from about 3:1 to about 100:1, and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design and other factors.

In order to facilitate charging the catalyst components into the reaction zone "in situ," they can be dissolved in a small amount of an inert organic solvent or butadiene monomer. Preformed and premixed catalyst systems will, of course, already be dissolved in a solvent.

The amount of para-styrenated diphenylamine that needs to be employed as a molecular weight-reducing agent varies with the catalyst system, with the polymerization temperature and with the desired molecular weight of the high cis-1,4-polybutadiene rubber being synthesized. For instance, if a high molecular weight rubber is desired, then a relatively small amount of para-styrenated diphenylamine is required. On the other hand, in order to reduce molecular weights substantially, a relatively large amount of the para-substituted diphenylamine will need to be employed. Generally, greater amounts of the para-styrenated diphenylamine are required when the catalyst system being utilized contains hydrogen fluoride or is an aged catalyst which contains boron trifluoride. However, as a general rule, from about 0.25 phm (parts by weight per hundred parts of monomer) to about 1.5 phm of the para-styrenated diphenylamine will be employed.

It is normally preferred to utilize 0.5 phm to 0.75 phm of the para-styrenated diphenylamine because, at such concentrations, good reductions in molecular weight can be realized and the high cis-1,4-polybutadiene rubber produced is provided with a good level of stabilization. In such cases, the molecular weight of the rubber being synthesized can be controlled by adjusting the ratio of the fluorine containing compound to the organoaluminum compound. In other words, at constant levels of the para-styrenated diphenylamine within the range of 0.25 phm to 1.5 phm, the molecular weight of the polymer being synthesized can be controlled by varying the ratio of the fluorine containing compound to the organoaluminum compound. Maximum reductions in molecular weight and maximum conversions normally occur at molar ratios of the fluorine containing compound to the organoaluminum compound which are within the range of 1.5:1 to 2:1. At molar ratios of less than 1.5:1 and at molar ratios within the range of 2:1 to 2.75:1, lesser reductions in molecular weight occur.

The temperatures utilized in the polymerizations of this invention are not critical and may vary from extremely low temperatures to very high temperatures. For instance, such polymerizations can be conducted at any temperature within the range of about −10° C. to about 120° C. The polymerization will preferably be conducted at a temperature within the range of about 30° C. to about 110° C. It is normally preferred for the polymerization to be carried out at a temperature which is within the range of about 70° C. to about 95° C. Such polymerizations will normally be conducted for a period of time which is sufficient to attain a high yield which is normally in excess of about 80 percent and preferably in excess of about 90 percent.

The cis-1,4-polybutadiene rubber utilized in making the blends of this invention typically has a cis content in excess of about 95 percent. For example, the cis-1,4-polybutadiene rubber will typically have a cis content of about 97 percent, a trans content of about 2 percent and a vinyl content of about 1 percent.

After the polymerization is completed, the cis-1,4-polybutadiene rubber may be recovered from the resulting polymer solution (rubber cement) by any of several procedures. One such procedure comprises mixing the rubber cement with a polar coagulating agent, such as methanol, ethanol, isopropylalcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated rubber is recovered from the slurry of the polar coagulating agent by centrifugation, decantation or filtration.

Another procedure for recovering the cis-1,4-polybutadiene rubber is by subjecting the rubber solution to spray drying. Such a procedure is particularly suitable for continuous operations and has the advantage that heat requirements are at a minimum. When such a procedure is used, the recovered polymer should be washed soon after recovery with a polar solvent in order to destroy the remaining active catalyst contained in the polymer. In such procedures, the vaporized organic solvents are also easily recovered but will normally require purification before being recycled.

The cis-1,4-polybutadiene rubber can then be blended with virtually any other type of rubbery polymer to make elastomeric compositions that exhibit improved processability and improved physical properties. For instance, such blends can be mixed more easily with less power consumption. They also have an improved capacity for incorporation of fillers, such as carbon black and/or silica. The cis-1,4-polybutadiene rubber compounds of this invention also exhibit improved tear resistance with little sacrifice in modulus, abrasion resistance or hysteretic properties.

The cis-1,4-polybutadiene rubber containing blends of this invention are useful in manufacturing automobile tires, light truck tires, heavy truck tires, aircraft tires, farm tires and earthmover tires. The rubber blends of this invention can also be used in manufacturing sporting goods, such as golf balls, tennis balls, racquet balls, golf club grips, and the like. Pharmaceutical products, such as stoppers, plungers, tubing, straps, diaphragms, and the like, can also be made with the blends of the cis-1,4-polybutadiene rubber. Engine mounts, bushings, weather stripping, windshield wiper blades, power transmission belts, conveyor belts, automotive hoses, industrial hoses, shoe soles, shoe heels, shoe foxing and other molded goods can also be made with blends of the cis-1,4-polybutadiene rubber.

The cis-1,4-polybutadiene rubber containing blends of this invention will typically be comprised of about 10 weight percent to about 90 weight percent of the cis-1,4-polybutadiene rubber and from about 10 weight percent to about 90 weight percent of at least one additional rubbery polymer. The additional rubbery polymer can be virtually any elastomeric polymer. In most cases, the additional rubbery polymer will be natural rubber, synthetic polyisoprene rubber, styrene-butadiene rubber (SBR), styrene-isoprene rubber (SIR), styrene-isoprene-butadiene rubber (SIBR), nitrile rubber, carboxylated nitrile rubber, medium vinyl polybutadiene rubber or a mixture of such rubbery polymers. The styrene-butadiene rubber used in such blends can be made by either solution polymerization (solution SBR) or emulsion polymerization (emulsion SBR).

It has been determined that cis-1,4-polybutadiene rubber which is synthesized by polymerizing 1,3-butadiene in the presence of (a) an organonickel compound, (b) an organoaluminum compound, (c) a fluorine containing compound and (d) para-styrenated diphenylamine has exceptional characteristics for utilization in manufacturing solid golf balls. For instance, golf balls manufactured with such cis-1,4-polybutadiene rubber have superior rebound properties and fatigue resistance. The cis-1,4-polybutadiene will typically have a Mooney ML 1+4 viscosity at 100° C. which is within the range of about 30 to about 90. The cis-1,4-polybutadiene will preferably have a Mooney ML 1+4 viscosity at 100° C. which is within the range of 30 to 70 and will most preferably have a Mooney ML 1+4 viscosity at 100° C. which is within the range of 35 to 45.

Solid golf balls generally include a core and a resin cover. The solid golf ball design may include a core obtained by one piece molding or be of a multi-piece design where one or more layers are coated onto the core. In any case, such solid golf balls of this invention include a resilient portion obtained by vulcanizing the cis-1,4-polybutadiene rubber containing composition which also includes a co-crosslinking agent, and a peroxide.

In addition to the cis-1,4-polybutadiene rubber, the resilient portion of the golf ball may also contain additional rubbers, such as styrene-butadiene rubber, natural rubber, synthetic polyisoprene rubber, styrene-isoprene rubber, and the like. The amount of such additional rubbers that can be included in the resilient portion of the golf ball will normally be no more than about 60 phr (parts per 100 parts by weight of rubber), based upon the total amount of rubber included in the resilient portion of the golf ball. Thus, the resilient portion of the golf ball will normally contain from about 40 phr to 100 phr of the cis-1,4-polybutadiene and from 0 phr to about 60 phr of such additional rubbers. It is normally preferred for such additional rubbers to be present in the resilient portion of the golf ball at a level of no more than about 30 phr. It is normally more preferred for such additional rubbers to be present in the resilient portion of the golf ball at a level of no more than about 15 phr.

The co-crosslinking agent used in the resilient portion of the golf ball will typically be an unsaturated carboxylic acid or a metal salt thereof. For example, the co-crosslinking agent can be acrylic acid, methacrylic acid, zinc acrylate, zinc methacrylate or a mixture thereof. The co-crosslinking agent will typically be present in the rubbery component of the golf ball at a level which is within the range of about 15 phr to about 60 phr. The co-crosslinking agent will typically be present in the resilient portion of the golf ball at a level which is within the range of about 25 phr to about 40 phr.

The peroxide used in the resilient portion of the golf ball will typically be an organic peroxide, such as dicumyl peroxide, t-butylperoxybenzoate or di-t-butylperoxide. It is normally preferred to use dicumyl peroxide in such golf ball compounds. The peroxide will typically be present in the rubbery component of the golf ball at a level which is within the range of about 0.5 phr to about 3 phr. The peroxide will preferably be present in the rubbery component of the golf ball at a level which is within the range of about 1 phr to about 2.5 phr.

Golf balls normally have a diameter which is within the range of about 41.15 mm to about 42.67 mm. To meet standardized weight requirements, the resilient portion of the golf ball will also typically contain a filler. Some representative examples of fillers that can be used include barium sulfate, zinc oxide, calcium carbonate, silica, and the like. Antidegradants can also be included in the rubbery component of the golf ball to protect it from degradation.

The rubber compound for the resilient portion of the golf ball can be prepared by mixing the cis-1,4-polybutadiene, the co-crosslinking agent, the peroxide, the optional filler and any other optional materials by conventional mixing techniques, such as by means of a roller or a kneader. The mixing will normally be carried out for about 10 to about 30 minutes, preferably about 15 to about 25 minutes, at a temperature of 50° C. to 140° C., preferably 70° C. to 120° C.

The solid golf ball can be a one-piece solid golf ball, a two-piece solid golf ball or a multi-piece solid golf ball. The one-piece solid golf ball can be prepared by vulcanizing the rubber compound through one piece molding. The two- and multi-piece solid golf balls normally include a solid core which is comprised of the resilient rubbery compound and a resin cover. In the case of multi-piece solid golf balls, the solid core is composed of a center core which is comprised of the resilient rubbery compound and one or more outer layers coated thereon. At least a portion of the solid core is prepared by vulcanizing the rubber composition of the present invention. The vulcanization will be conducted at a temperature which is within the range of about 140° C. to 170° C. for about 20 to 40 minutes. The resin cover is one typically comprised of an ionomer resin or a mixture of ionomer resins. Suitable ionomer resins are commercially available from the Mitsui Polychemical Company under the trade names Himilan™ 1707, Himilan™ 1706 and Himilan™ 1605.

The practice of this invention is further illustrated by the following examples which are intended to be representative rather than restrictive of the scope of the subject invention. Unless indicated otherwise, all parts and percentages are given by weight.

EXAMPLE 1

Golf balls can be manufactured by first making a golf ball core compound by mixing 100 phr of Budene® 1280 with 30 phr of zinc acrylate, 22 phr of zinc oxide, 2 phr of dicumylperoxide and 0.5 phr of antioxidant. The golf ball core compound can then be molded and cured at a temperature of 145° C. for 40 minutes into solid cores having a diameter of 38.5 mm. The solid cores can then be covered with Himilan™ 1707 ionomer that contains about 2 parts by weight of titanium dioxide to produce golf balls. Such golf balls exhibit improved compression, an improved coefficient of restitution and improved durability.

EXAMPLE 2

Golf balls can be manufactured by first making a golf ball core compound by mixing 100 phr of Budene® 1280 with 25 phr of methacrylic acid, 25 phr of zinc oxide and 1 phr of dicumylperoxide. The golf ball core compound can then be molded and cured at a temperature of 170° C. for 25 minutes into solid cores having a diameter of 38.5 mm. The solid cores can then be covered with Himilan™ 1707 ionomer that contains about 2 parts by weight of titanium dioxide to produce golf balls. Such golf balls exhibit improved compression, an improved coefficient of restitution and improved durability.

EXAMPLE 3

In this series of experiments, various other types of cis-1,4-polybutadiene rubber were evaluated and compared to Budene® 1280 in golf ball core compounds. As can be seen from Table I, the golf balls made with core compound made utilizing Budene® 1280 had superior compression characteristics to the golf balls made utilizing other types of cis-1,4-polybutadiene rubber. The other cis-1,4-polybutadiene rubbers evaluated included Budenee® 1208 polybutadiene rubber, a cis-1,4-polybutadiene made with a cobalt catalyst system (Co PBD) and a cis-1,4-polybutadiene made with a neodymium catalyst system (Nd PBD).

TABLE I

| | Budene ® 1280 PBD | Budene ® 1208 PBD | Co PBD | Nd PBD |
|---|---|---|---|---|
| Mooney ML 1 + 4 | 40 | 45 | 42 | 42 |
| Torque Max. | 63 | 66 | 61 | 58 |
| T'C90 | 1.9 | 1.7 | 1.5 | 1.6 |
| Bashore Rebound | 68 | 69 | 69 | 71 |
| Zwick Rebound | 80 | 80 | 80 | 79 |
| Ball Compression | 83 | 79 | 80 | 79 |
| Compression Deflection, 60%, psi | 6750 | 6752 | 6544 | 6749 |
| Compression Deflection, Max, % | 80 | 80 | 80 | 80 |
| Compression Deflection, psi @ max. | 11956 | 11651 | 10375 | 11875 |

While certain representative embodiments and details have been shown for the purpose of illustrating the subject invention, it will be apparent to those skilled in this art that various changes and modifications can be made without departing from the scope of the present invention.

What is claimed is:

1. A golf ball which is comprised of a solid core and a resin cover, wherein the solid core is comprised of cis-1,4-polybutadiene rubber which is made by polymerizing 1,3-butadiene in the presence of (a) an organonickel compound, (b) an organoaluminum compound, (c) a fluorine containing compound and (d) para-styrenated diphenylamine; wherein the organoaluminum compound and the fluorine containing compound are brought together in the presence of the para-styrenated diphenylamine.

2. A golf ball as specified in claim 1 wherein the solid core is further comprised of a co-crosslinking agent and a peroxide.

3. A golf ball as specified in claim 2 wherein the co-crosslinking agent is present at a level which is within the range of about 15 phr to about 60 phr.

4. A golf ball as specified in claim 3 wherein the peroxide is present at a level which is within the range of about 0.5 phr to about 3 phr.

5. A golf ball as specified in claim 3 wherein the peroxide is present at a level which is within the range of about 1 phr to about 2.5 phr.

6. A golf ball as specified in claim 2 wherein the co-crosslinking agent is present at a level which is within the range of about 25 phr to about 40 phr.

7. A golf ball as specified in claim 6 wherein said core is further comprised of a filler.

8. A golf ball as specified in claim 7 wherein said filler is selected from the group consisting of barium sulfate, zinc oxide, calcium carbonate and silica.

9. A golf ball as specified in claim 8 wherein said cis-1,4-polybutadiene has a Mooney ML 1+4 viscosity as measured at 100° C. which is within the range of about 30 to about 90.

10. A golf ball as specified in claim 8 wherein said cis-1,4-polybutadiene has a Mooney ML 1+4 viscosity as measured at 100° C. which is within the range of about 30 to about 70.

11. A golf ball as specified in claim 8 wherein said cis-1,4-polybutadiene has a Mooney ML 1+4 viscosity as measured at 100° C. which is within the range of about 35 to about 45.

12. A rubber composition for a solid golf ball having excellent durability and rebound properties comprising: (a) cis-1,4-polybutadiene rubber, wherein said cis-1,4-polybutadiene rubber has a Mooney ML 1+4 viscosity of 30 to 90, wherein said cis-1,4-polybutadiene rubber has a cis-1,4 bond content of at least 95 percent, wherein cis-1,4-polybutadiene rubber is made by polymerizing 1,3-butadiene in the presence of (a) an organonickel compound, (b) an organoaluminum compound, (c) a fluorine containing compound and (d) para-styrenated diphenylamine, and wherein the organoaluminum compound and the fluorine containing compound are brought together in the presence of the para-styrenated diphenylamine; (b) a co-crosslinking agent and (c) a peroxide.

13. A rubber composition as specified in claim 12 wherein the co-crosslinking agent is present at a level which is within the range of about 15 phr to about 60 phr; and wherein the peroxide is present at a level which is within the range of about 0.5 phr to about 3 phr.

14. A rubber composition as specified in claim 13 wherein the peroxide is present at a level which is within the range of about 1 phr to about 2.5 phr.

15. A rubber composition as specified in claim 14 wherein the co-crosslinking agent is present at a level which is within the range of about 25 phr to about 40 phr.

16. A rubber composition as specified in claim 13 which is further comprised of a filler.

17. A rubber composition as specified in claim 16 wherein said filler is selected from the group consisting of barium sulfate, zinc oxide, calcium carbonate and silica.

18. A rubber composition as specified in claim 17 wherein said cis-1,4-polybutadiene has a Mooney ML 1+4 viscosity as measured at 100° C. which is within the range of about 30 to about 70.

19. A rubber composition as specified in claim 17 wherein said cis-1,4-polybutadiene has a Mooney ML 1+4 viscosity as measured at 100° C. which is within the range of about 35 to about 45.

* * * * *